H. WEICHSEL.
ALTERNATING CURRENT MOTOR.
APPLICATION FILED APR. 12, 1915.

1,214,980.

Patented Feb. 6, 1917.
2 SHEETS—SHEET 1.

H. WEICHSEL.
ALTERNATING CURRENT MOTOR.
APPLICATION FILED APR. 12, 1915.

1,214,980.

Patented Feb. 6, 1917.
2 SHEETS—SHEET 2.

WITNESSES:
C. B. Yoder
W. F. Alexander

INVENTOR
Hans Weichsel
BY
E. E. Huffman
ATTORNEY

UNITED STATES PATENT OFFICE.

HANS WEICHSEL, OF ST. LOUIS, MISSOURI, ASSIGNOR TO WAGNER ELECTRIC MANUFACTURING COMPANY, OF ST. LOUIS, MISSOURI, A CORPORATION OF MISSOURI.

ALTERNATING-CURRENT MOTOR.

1,214,980.

Specification of Letters Patent.  Patented Feb. 6, 1917.

Application filed April 12, 1915. Serial No. 20,697.

*To all whom it may concern:*

Be it known that I, HANS WEICHSEL, a subject of the Emperor of Germany, residing at the city of St. Louis, State of Missouri, United States of America, have invented a certain new and useful Alternating-Current Motor, of which the following is such a full, clear, and exact description as will enable any one skilled in the art to which it appertains to make and use the same, reference being had to the accompanying drawings, forming part of this specification.

My invention relates more particularly to single-phase asynchronous induction motors having a shunt characteristic and the object of the invention is to produce a machine of this type which will start with a powerful torque, operate at a plurality of speeds, and yet be of cheap and efficient construction.

In carrying out my invention, I make use of a stator provided with means for changing the number of poles and of a rotor carrying a commuted winding adapted to coöperate with brushes resting on the commutator, and also of means for totally short-circuiting the commuted winding. I prefer to so select the step or pitch of the commuted winding that it will permit the machine to start as a commutator motor, with the stator connected to produce the largest number of poles for which the machine is designed, and, at the same time, be capable of coöperating, after said commuted winding is totally short-circuited, with any of the numbers of poles which the stator can produce.

My preferred mode of operating the machine is to cause the same to run up to its lowest speed as a commutator motor and with the largest number of poles for which the stator is designed, and then to reach the higher speeds at which the machine is capable of running, on a commutatorless induction motor performance, or, in other words, with totally short-circuited rotor and induction motor characteristics.

Figure 1:
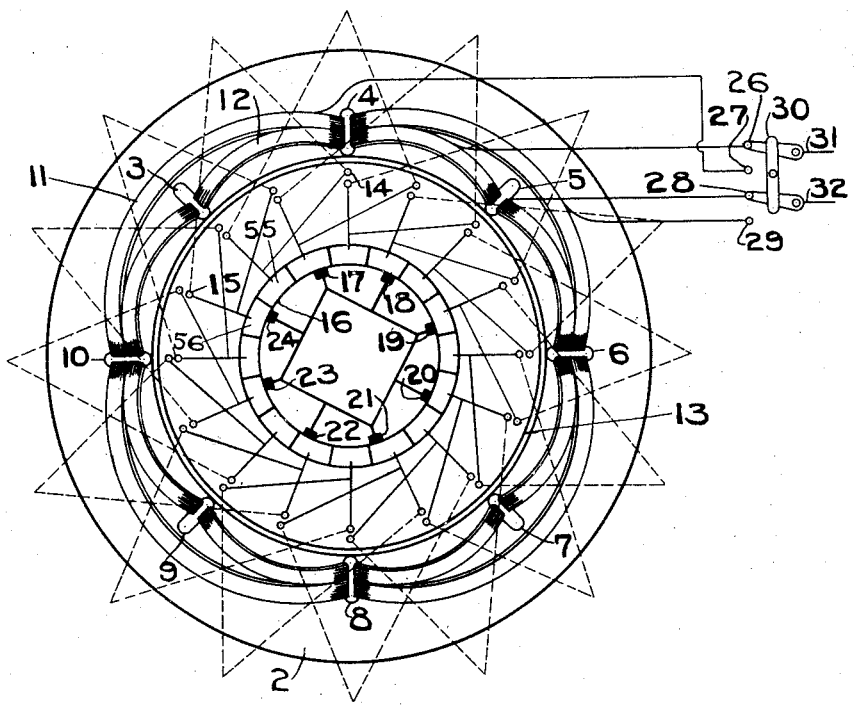
Figure 2:
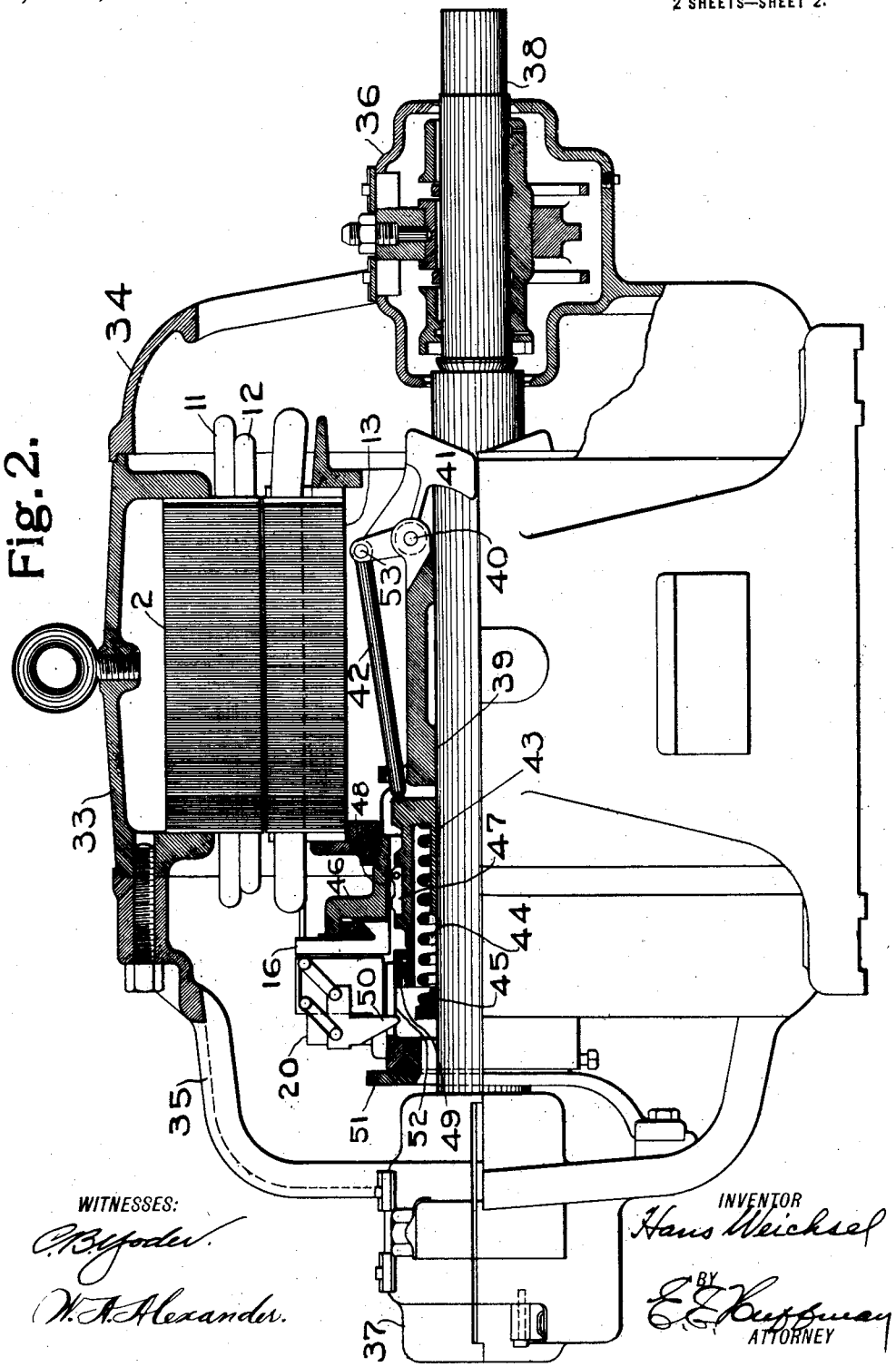

My invention will be better understod by reference to the accompanying drawings, in which Figure 1 diagrammatically indicates the stator and rotor windings, while Fig. 2 outlines the mechanical construction of the machine and particularly one form of short-circuiting device that may be used in connection with the rotor winding.

Referring to Fig. 1, 2 is a stator provided with the slots 3 to 10 inclusive and carrying a 4-pole winding 11 comprising four coils, each spanning two teeth and connected in series between the terminals 27 and 29, and also an 8-pole winding 12, comprising eight coils each spanning one tooth and connected in series between the terminals 26 and 28. The 2-pole switch 30 makes it possible for the mains 31, 32 to be connected either to the 4-pole or to the 8-pole stator winding. In the figure, these mains are connected to the 8-pole winding.

The rotor 13 carries a number of conductors, such as 14, 15, preferably located in slots or holes within the iron laminations and connected to a commutator 16. The rotor winding is preferably of the parallel or lap type, as shown in Fig. 1, and its step or pitch is so chosen as to be greater than that of the larger number of stator poles and smaller than that of the smaller number of stator poles. In this case, the step of the 8-pole stator winding embraces 45 degrees, while the step of the 4-pole winding embraces 90 degrees. The step of the commuted rotor winding is accordingly chosen to embrace about $67\frac{1}{2}$ degrees, as may be seen by following the commuted winding connections from segment 56 to the conductor 15, along the dotted lines representing the back connections of the rotor, to the conductor 14, and along the full line representing the front connections of the rotor, to the commutator segment 55 adjacent to the one to which the conductor 15 is connected. In the example shown, the motor is arranged to start as a series induction machine with rotor excitation, frequently referred to as a "repulsion" motor, and the commuted rotor winding is, therefore, short-circuited by means of brushes along axes displaced from the axes of the 8-pole magnetization produced by the stator. Because the rotor winding is of the parallel, and not of the series type, a brush is provided for each of the eight poles produced by the stator. Brushes of the same polarity, such as 17, 19, 21 and 23 are connected to each other and also to the brushes of opposite polarity, 18, 20, 22 and 24.

The system of windings described coöperates with the short-circuiting and brush controlling device illustrated in Fig. 2, which also shows a possible general arrangement of a machine of this kind. The shaft 38 carries the rotor 13 and is supported in bearings 36 and 37 attached to end plates 34, 35, centered on a frame 33 supporting the stator laminations 2, within which are embedded the stator windings 11, 12. The commutator 16 is of the vertical face type and is held in a casting 46 attached to the spider 39 keyed to the shaft and supporting the rotor laminations 13. This casting 46 carries an annular conducting sleeve 48, bored out to the same inner diameter as the commutator 16 but normally insulated from the latter. One of the brushes 20 coöperating with the commutator 16, is shown in this figure, and is held in contact with the vertical face of the commutator by means of a spring controlled clamp provided with a projection or nose 50 reaching through a slot 52 provided in the brush holder support 51. A sleeve 43, capable of longitudinal motion along the shaft 38, carries a large number of loosely mounted short-circuiting elements 47 located in a groove provided in said sleeve and normally so positioned that they can only make contact with the conductive sleeve 48 but not with the commutator 16. This sleeve and the short-circuiting elements 47 are held in this position by means of a coil spring 44, resting against a nut 45 screwed on the shaft 38, and by means of which the tension of the spring 44 can be adjusted. The sleeve 43 and the short-circuiting elements 47 are also under the control of weights 41 hinged on pins 40 attached to the spider 39, the movement of said weights being transmitted to the sleeve 43 by means of rods 42 loosely connected to the weights 41 by means of pins 53.

The operation of the short-circuiting device shown in Fig. 2, is somewhat as follows:

As long as the spring 44 is in control of the sleeve 43, the relative positions of the inner face of the commutator 16, the inner face of the conducting sleeve 48 insulated from that commutator, and of the short-circuiting elements 47, are as shown in the figure. But as soon as the rotor has reached a sufficient speed, the weights 41 are thrown outward, away from the center of the shaft, by centrifugal force, and, since they pivot on the pins 40, they force the rods 42 from right to left in a direction opposed to the effort exerted by the spring 44. As soon as this spring is overpowered, the sleeve 43 and with it the short-circuiting elements 47 move to the left and into such a position as to make electrical connection between the inner face of the commutator and the inner face of the conducting tube 48,—good contact between the short-circuiting elements 47, the tube and the inner face of the commutator being, in part, secured by the centrifugal force which tends to throw the elements 47 out of the groove in the sleeve 43 in which they are located and presses them hard against the inner commutator face and the tube 48, thus totally short-circuiting all the commutator segments and, therefore, the commuted rotor winding. This same movement of the sleeve 43 forces the projection 49 thereof into engagement with the nose 50 of the spring-controlled clamp holding the brush in contact with the vertical commutator face, pushes this nose upward and to the left, or away from the commutator, and thus also breaks contact between the brushes and the commutator.

The mode of operation of the machine as a whole, is as follows:

The spring 44 and the weights 41 are so adjusted that the commuted winding will be totally short-circuited in the manner above described, just before the machine reaches the lowest speed for which it is designed. When it is desired to start this motor, the switch 30 is placed in the position shown, thus producing the largest number of poles in the stator. The brushes coöperating with the commutator 16 are permanently so located as to give the desired torque when switch 30 is in the position shown. Under these conditions, the motor will start in a manner now well understood and, as soon as its speed reaches the neighborhood of the synchronous corresponding to the number of poles for which the stator is connected, the short-circuiting device will operate to convert the commuted winding into a short-circuited pole winding and force the brushes off the commutator face. In order to reach a higher speed, it is necessary to throw the switch 30 from the points 26, 28 to points 27, 29, thus producing four instead of eight stator poles and causing the motor to reach its higher speed without the coöperation of the commutator 16 but with a totally short-circuited rotor and on a pure induction motor performance. When it is desired to drop from the higher to the lower speed, it is convenient to interrupt the stator circuits for a time sufficient to allow the speed to reach the neighborhood of the synchronous corresponding to the higher number of poles, and then to close the stator switch in such a way as to produce that higher number of poles.

For the sake of a clear illustration of my invention, I have only shown eight stator and sixteen rotor slots. It is obvious that, in practice, the number of slots in both members should be considerably larger. It is also well understood that the stator may be provided with a single winding, so arranged as to be capable of successively producing different numbers of poles by reorganizing the connections of its elements. While I have illustrated my invention as applied to a stator capable of producing two sets of poles, namely four and eight, yet it is by no means restricted to such a machine and may be applied to a motor, the stator of which is adapted to produce more than two sets of poles. In such a case, I still prefer to so select the step of my commuted winding as to make it larger than the step of the largest number of poles and smaller than the step of the smallest number of poles for which the stator is wound, or which the stator may produce. While it is convenient to make provision for withdrawing the brushes from contact with the commutator after the rotor winding has been short-circuited, yet it is by no means necessary to do so. Because of the small number of commutator segments shown in Fig. 1, the drawing would indicate that, at times, the rotor winding is totally short-circuited by the brushes, but it will be understood that this condition will not occur in practice since a much greater number of commutator segments per pole will be used.

Having fully described my invention, what I claim as new and desire to secure by Letters-Patent of the United States is:

1. In an alternating current motor, the combination of means for successively producing different numbers of stator poles, a rotor provided with a commuted winding having a pitch greater than the pitch of the largest number of stator poles available and smaller than the pitch of the smallest number of stator poles available, and means for short-circuiting the commuted winding to render it inductively responsive to more than one number of stator poles, said means being inoperative at starting.

2. In an alternating current motor, the combination of means for successively producing different numbers of stator poles, a rotor provided with a commuted winding having a pitch greater than the pitch of the largest number of stator poles available and smaller than the pitch of the smallest number of stator poles available, and means for inter-connecting all of the elements of the commuted winding when a desired speed is attained.

In testimony whereof, I have hereunto set my hand and affixed my seal in the presence of the two subscribing witnesses.

HANS WEICHSEL. [L. S.]

Witnesses:
CATHERINE SCHIESS,
HARRY HENZE.